March 7, 1950  J. K. DOUGLAS  2,499,633
HYDRAULIC DRIVE FOR PLANERS AND THE LIKE
Filed Feb. 5, 1948  2 Sheets-Sheet 2
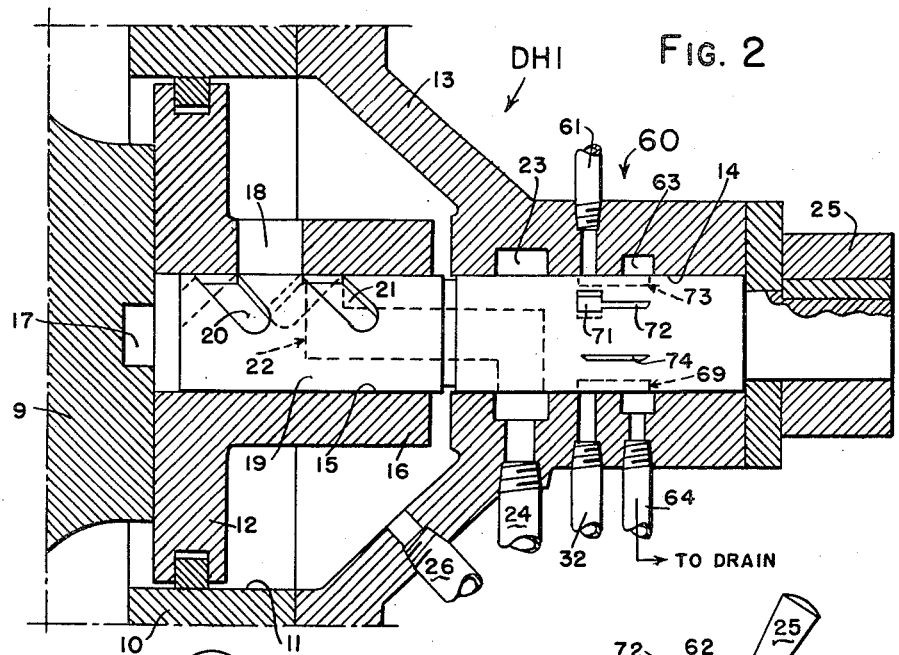
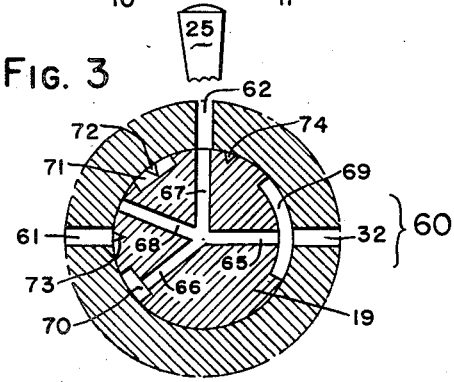
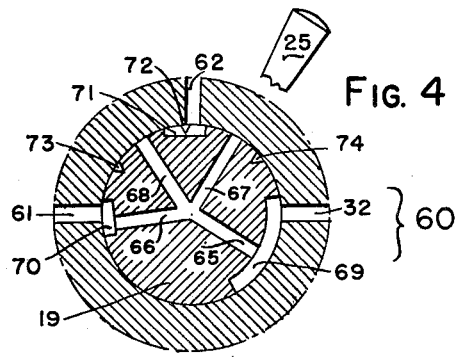
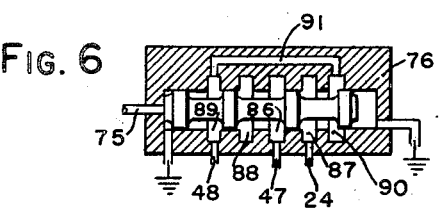
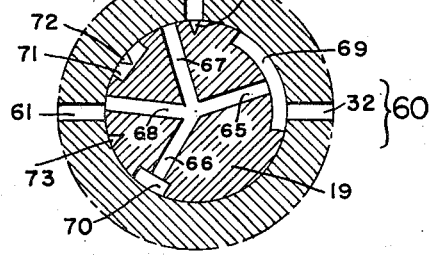
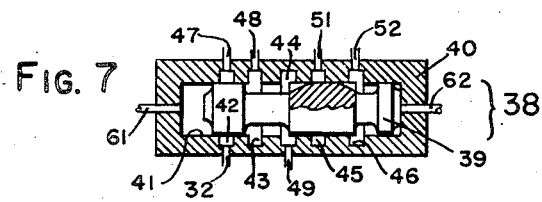
INVENTOR
JAMES K. DOUGLAS
BY Wesley P Merrill
ATTORNEY Patented Mar. 7, 1950

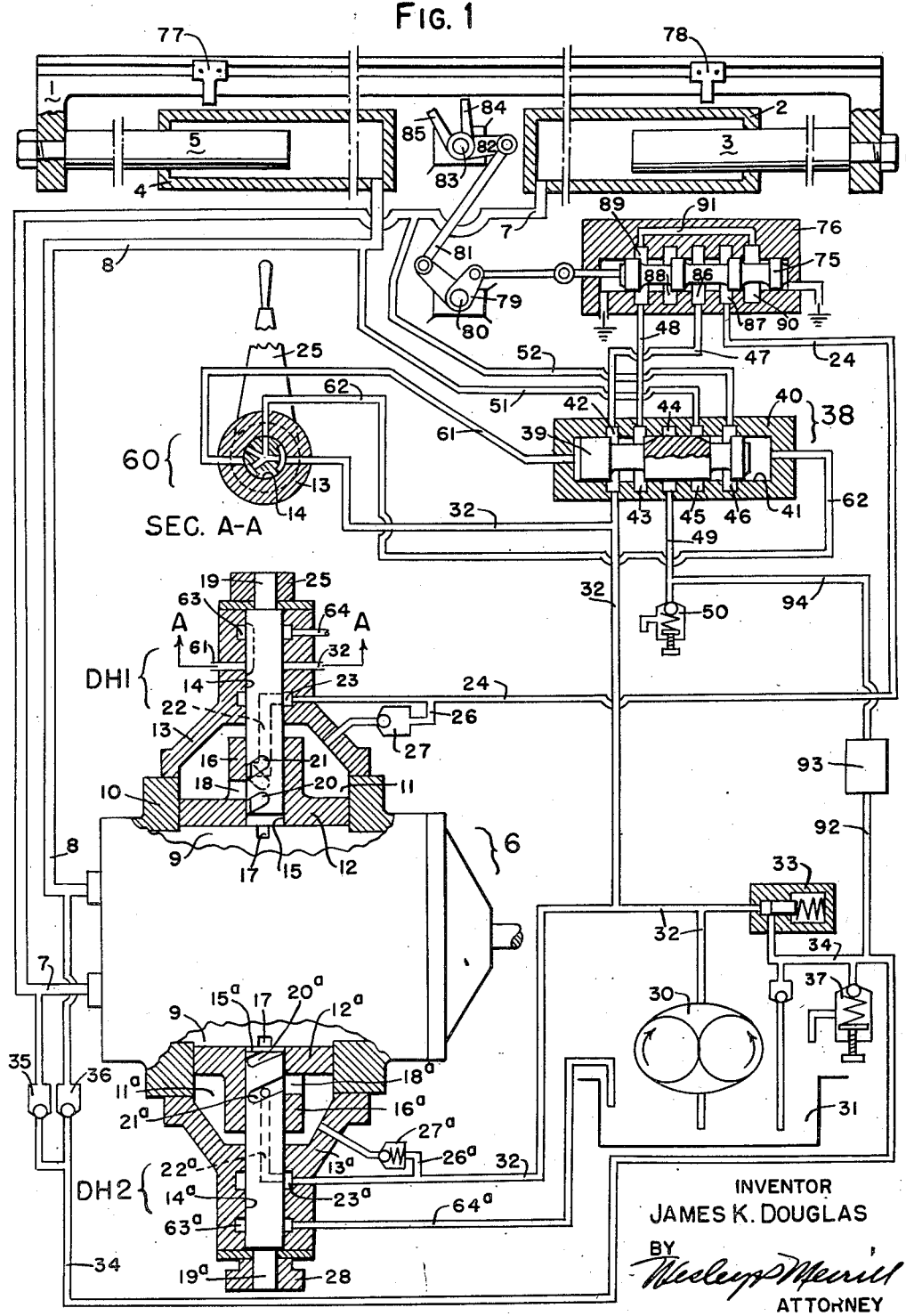

2,499,633

UNITED STATES PATENT OFFICE 2,499,633

HYDRAULIC DRIVE FOR PLANERS AND THE LIKE

James K. Douglas, Shorewood, Wis., assignor to The Oilgear Company, Milwaukee, Wis., a corporation of Wisconsin Application February 5, 1948, Serial No. 6,503

9 Claims. (Cl. 60—52)

This invention relates to hydraulic drives of the type in which a pump and one or more hydraulic motors are connected into a hydraulic circuit and the flow of liquid in the circuit is intermittently reversed to cause the motor or motors to operate in opposite directions alternately.

A drive embodying the invention is particularly adapted for driving a machine in which work is operated upon by a tool in response to relative reciprocation between the tool and the work. For the purpose of illustration, the invention has been shown embodied in a drive for reciprocating the table or carriage of a planer of the type in which the work to be machined is fastened to the table and a tool or tools carried by a stationary crossrail takes successive cuts from the work during reciprocation of the table but it is to be understood that the invention is not limited to a drive for such a machine.

The table of a planer ordinarily may be started, stopped or reversed by means of a control element which ordinarily is arranged alongside the table and adjacent the cross-rail so that the operator may put or keep his hand upon it while watching the tool operate upon the work.

The speed of the table during its cutting stroke must be adjusted in accordance with the nature of the work and the type of cut being taken but the prior hydraulic drives had no positive speed adjusting means which could be operated from the operator's station.

The present invention has as an object to provide a hydraulic drive in which the speed of the table may be regulated by operating the same control element by means of which the operator may start, stop and reverse the table.

The range of reciprocation of a planer table is determined by two dogs which are fastened to the table at spaced apart points and which operate a reversing mechanism at each end of the table stroke so that after being started the table will continue to reciprocate within a fixed range until its movement is stopped or altered by the operator. However, it is necessary at times to move the table beyond its normal range of reciprocation but no prior hydraulic drive was provided at the operator's station with a control which could be adjusted to a given position to effect movement of the table beyond its normal range of reciprocation.

Another object of the present invention is to provide a hydraulic drive in which the table may be moved beyond its normal range of reciprocation by operating the same element by means of which the operator may start, stop and reverse the table.

Another object is to provide a hydraulic drive having a single control element which may be operated to start, stop or reverse the motor, to effect continuous reciprocation of the motor or to vary the speed of the motor.

Other objects and advantages of the invention will appear from the following description of a hydraulic drive in which the invention is embodied. The drive is shown schematically in the accompanying drawings in which the views are as follows:

Fig. 1 is a diagram illustrating the functional relationship of the parts which are shown in different planes in order that all hydraulic connections may be illustrated.

Fig. 2 is a view showing on a considerably enlarged scale a part of the pump control mechanism shown in Fig. 1.

Fig. 3 is a view corresponding to section A—A of Fig. 1 but drawn to a still larger scale.

Figs. 4 and 5 are views similar to Fig. 3 but showing the rotary valve member in positions different from that shown in Fig. 3.

Figs. 6 and 7 are views showing two valves in positions different from those shown in Fig. 1.

For the purpose of illustration, the drive has been shown as being employed to reciprocate the table 1 of a planer of conventional type. Since such planers are well known and form no part of the present invention, only the table has been illustrated. Table 1 is reciprocated by a hydraulic motor which may be of the double acting type but which has been shown as consisting of a stationary single acting cylinder 2 having a ram 3 connected to one end of table 1 and a stationary single acting cylinder 4 having a ram 5 connected to the other end of table 1. Liquid for operating the hydraulic motor is supplied by a pump 6 which is connected to cylinders 2 and 4, respectively, by channels 7 and 8. When the drive is operating, pump 6 is continuously driven from any suitable source of power.

Pump 6 may be of any suitable type but it has been indicated as being of the general type shown in Patent No. 2,227,814. Since such pumps are well known and in extensive use, it is deemed sufficient to state herein that the pump has its pumping mechanism arranged within a displacement varying member or slide block 9 which is arranged within the casing 10 of the pump; that pump displacement will be zero when slideblock 9 is in its central or neutral position, and that the pump will deliver liquid in a direction and at a rate dependent upon the direction and distance slideblock 9 is shifted from its neutral position.

Slideblock 9 is adapted to be shifted in one direction or the other in response to operation of a control which is arranged upon the upper side of pump 6 in respect to Fig. 1 and is shown on a larger scale in Fig. 2. This control includes a cylinder 11, which is formed in the side wall of pump casing 10, and a piston 12 which engages slideblock 9 and is fitted in cylinder 11 to form therewith a servo-motor for shifting slideblock 9.

Cylinder 11 is closed at its outer end by a head 13 having a bore 14 formed therein in axial alignment with a bore 15 which extends through piston 12 and through an extension or hub 16 formed upon the outer face of piston 12. The inner end of bore 15 communicates at all times with the interior of casing 10 as by means of a slot 17 formed in slideblock 9.

Liquid is adapted to flow into and out of cylinder 11 through a port 18 which extends through the wall of hub 16 into communication with bore 15. Port 18 is controlled by a rotary valve member 19 which is closely fitted in bores 14 and 15 and has two spiral grooves 20 and 21 formed in its periphery at opposite sides of port 18 and spaced apart a distance equal to the diameter of port 18.

One end of groove 20 extends to the end of valve member 19 so that groove 20 is at all times in communication with the inner end of bore 15. Groove 21 communicates with one end of an internal passage 22 which extends through valve member 19 and has its other end in communication with an annular groove 23 which is formed in the wall of bore 14. Groove 23 communicates with a channel 24 which is fastened to head 13 and is adapted to be supplied with motive liquid at a substantially constant pressure as will presently be explained.

Valve member 19 is adapted to be rotated by a lever 25 which is fixed to the outer end thereof and also restrains valve member 19 from axial movement. In order to simplify the drawing, lever 25 has been shown as being manually operable which would necessitate arranging pump 6 near the operator's station alongside table 1 so that lever 25 would be within reach of the operator but in practice pump 6 is arranged in a more convenient location and lever 25 is connected by linkage to a manually operable lever which is arranged at the operator's station and provided with means for retaining it in any adjusted position.

The arrangement is such that, when channel 24 is supplied with motive liquid and groove 21 registers with port 18, liquid may flow from channel 24 through groove 23, passage 22, groove 21 and port 18 into cylinder 11 and, when groove 20 registers with port 18, liquid may escape from cylinder 11 through port 18, groove 20, the inner end of bore 15 and slot 17 into pump casing 10.

In order that liquid may be permitted to escape from cylinder 11 independently of valve member 19, the interior of cylinder 11 is connected to channel 24 by a channel 26 having arranged therein a check valve 27 which permits liquid to flow from cylinder 11 into channel 24 but prevents flow of liquid from channel 24 into cylinder 11 except through valve member 19.

The pump control thus far described is in extensive use and is known commercially as a "DH" control. Therefore, the control as an entirety has been designated by the reference character DH1.

In order for a DH control to function, the slideblock must be urged toward it by a spring or other means such as a simple hydraulic servo-motor which is continuously supplied with liquid at a constant pressure as shown in Patent 2,227,814. In the present instance however, slideblock 9 is urged toward control DH1 by a second DH control which has been designated by the reference character DH2 and which is the same as control DH1 except that its cylinder 11ᵃ and piston 12ᵃ are smaller than cylinder 11 and piston 12 and its valve member 19ᵃ is provided on its outer end with a knob 28 for rotating it to adjusted positions. Therefore, like parts have been indicated by like reference numerals with the exponent "a" added to the reference numerals applied to control DH2. Knob 28 ordinarily is provided with graduations (not shown) for indicating the angular position of valve 19ᵃ.

Liquid for energizing the two DH controls is supplied by a gear pump 30 which draws liquid from a reservoir 31 and discharges it into a branched supply channel 32. Gear pump 30 and reservoir 31 have been shown separate from pump 6 in order that the hydraulic circuit may be clearly illustrated but in practice gear pump 30 is driven in unison with pump 6 and is arranged within pump casing 10.

One branch of channel 32 is connected to the inlet of a relief valve 33 having the outlet thereof connected to a channel 34 which is connected to channels 7 and 8 through two check valves 35 and 36 respectively. Gear pump 30 discharges liquid at a rate in excess of requirements and a part of this liquid is discharged through relief valve 33 which opens at a predetermined pressure, such as 150 p. s. i., and enables gear pump 30 to maintain that pressure in channel 32. A part of the liquid discharged through relief valve 33 is discharged through a relief valve 37 which is connected to channel 34 and discharges into reservoir 31. Relief valve 37 is adjusted to open at a somewhat lower pressure, such as 125 p. s. i. and thereby causes gear pump 30 to supercharge pump 6 at that pressure.

Groove 23ᵃ of control DH2 has a branch of supply channel 32 connected thereto, and knob 28 is initially rotated through a predetermined angular distance in a direction to open groove 21ᵃ to port 18ᵃ so that servo-motor 11ᵃ—12ᵃ is continuously energized.

Groove 23 of control DH1 is connected by channel 24 to a reversing valve which is adapted either to connect channel 24 to supply channel 32, so that servo-motor 11—12 will be energized, or to connect channel 24 to exhaust so that servo-motor 11—12 will be deenergized as will presently be explained.

The arrangement is such that, when channel 24 is connected to supply channel 32 and valve member 19 is rotated in a direction to open groove 21 to port 18, liquid will flow through channel 24, groove 23, passage 22, groove 21 and port 18 into cylinder 11 and cause piston 12 to move slideblock 9 in a direction to cause pump 6 to discharge liquid into channel 7, which direction is toward the left in respect to Fig. 2 or downward in respect to Fig. 1. Piston 12ᵃ of control DH2 will move with slideblock 9 and will eject liquid from cylinder 11ᵃ into channel 32 for the reason that the effective pressure area of piston 12ᵃ is smaller than that of piston 12.

Piston 12 will start to move as soon as valve member 19 starts to open groove 21 to port 18. Since port 18 is formed in hub 16 and moves with piston 12, it will tend to move out of registry with groove 21 as fast as rotation of valve 19 opens groove 21 to port 18. Therefore, piston 12 will move through a distance proportional to the angular distance through which valve member 19 is rotated and it will cease to move substantially as soon as rotation of valve member 19 ceases.

When valve member 19 is rotated in the opposite direction, groove 20 will register with port 18 and destroy the pressure in cylinder 11. Then the liquid continuously supplied to cylinder 11a will cause piston 12a to move slideblock 9 upward in respect to Fig. 1 and piston 12 will eject liquid from cylinder 11 through port 18, groove 20, the inner end of bore 15 and slot 17 into pump casing 10. Slideblock 9 will continue to move either until port 18 moves out of registry with groove 20 and traps the remaining liquid in cylinder 11 or until port 18a moves out of registry with groove 21a and cuts off the flow of liquid into cylinder 11a.

Rotation of valve member 19 in one direction or the other thus causes slideblock 9 to be shifted in one direction or the other and pump 6 to discharge into one or the other of channels 7 and 8.

Slideblock 9 may also be shifted in opposite directions alternately without rotating valve member 19 in opposite directions alternately. This is accomplished by initially turning knob 28 through a predetermined angular distance in a direction to open groove 21a to port 18a, initially rotating valve member 19 through a predetermined angular distance in a direction to open groove 21 to port 18 and then connecting channel 24 to gear pump 30 and to exhaust alternately.

With the two DH controls adjusted in this manner, connecting channel 24 to gear pump 30 will permit liquid to flow through valve member 19 to cylinder 11 and cause piston 12 to move slideblock 9 downward in respect to Fig. 1 until groove 21 moves out of registry with port 18, thereby causing pump 6 to discharge liquid into channel 7 at the rate determined by the angular distance through which valve member 19 was initially rotated from its neutral position. Piston 12a will move with slideblock 9 and eject liquid from cylinder 11a through valve member 19a and/or check valve 27a into supply channel 32. Conversely, connecting channel 24 to exhaust will permit the liquid continuously supplied to cylinder 11a to cause piston 12a to move slideblock 9 upward in respect to Fig. 1 until groove 21a moves out of registry with port 18a, thereby causing pump 6 to discharge liquid into channel 8 at the rate determined by the angular distance through which valve member 19a was initially rotated from its neutral position. Piston 12 will move with slideblock 9 and eject liquid from cylinder 11 through check valve 27 and channel 24 to exhaust.

Channel 24 may be connected to gear pump 30 and to exhaust alternately only after valve member 19 has been rotated through a predetermined angular distance in a direction to open groove 21 to port 18 as will presently be explained. When valve member 19 is at or near its neutral position, channel 24 is always connected to gear pump 30.

If valve member 19 is returned to its neutral position when pump 6 is discharging into channel 7, the liquid continuously supplied to cylinder 11a will cause piston 12a to move slideblock 9 upward in respect to Fig. 1 and piston 12 will eject liquid from cylinder 11 through port 18, groove 20, bore 15 and slot 17 into pump casing 10 until slideblock 9 reaches its neutral position at which time port 18 will move out of registry with groove 20 and trap the remaining liquid in cylinder 11, thereby preventing further movement of slideblock 9 and stopping it in its neutral position.

If valve member 19 is returned to its neutral position when pump 6 is discharging into channel 8, liquid will flow through valve member 19 into cylinder 11 and cause piston 12 to move slideblock 9 downward in respect to Fig. 1 until slideblock 9 reaches its neutral position at which time port 18 will move out of registry with groove 21 and cut off further flow of liquid in cylinder 11, thereby stopping slideblock 9 in its neutral position.

If slideblock 9 should fail to stop exactly in its neutral position or if it should wander slightly from its exact neutral position, pump 6 will discharge liquid at a very limited rate into channel 7 or channel 8. In order to prevent this limited discharge of liquid from causing table 1 to creep, means are provided for bypassing any liquid discharged by pump 6 after it has been adjusted to neutral.

As shown, the drive is provided with a hydraulically operated valve 38 which is adapted to provide a neutral bypass for pump 6 and is also adapted to prevent channel 24 from being connected to exhaust when pump 6 is adjusted to neutral.

Valve 38 includes a valve plunger 39 and a valve casing 40 having an axial bore 41 in which plunger 39 is fitted and adapted to control communication between five annular grooves or ports 42, 43, 44, 45 and 46 formed in the wall of bore 41. Port 42 has a branch of supply channel 32 connected thereto and it is also connected by a channel 47 to a reversing valve presently to be described. Port 43 is connected by a channel 48 to the reversing valve. Port 44 communicates with one end of an exhaust channel 49 having on the other end thereof a relief valve 50 which is adapted to open at a low pressure, such as 5 p. s. i., and to discharge into reservoir 31. Ports 45 and 46 are connected to channels 8 and 7, respectively, by two channels 51 and 52.

When control DH1 is adjusted from its neutral or zero displacement position to a positive displacement position, pump 6 starts to discharge liquid into channel 7 or 8 before valve plunger 39 is shifted. If port 45 were fully open to port 46, all of the liquid discharged by pump 6 would be bypassed through valve 38 until its plunger 39 was shifted and then the entire output of pump 6 would be suddenly directed into cylinder 2 or 4 which would cause table 1 to jump. In order to prevent table 1 from jumping when the drive is started, valve plunger 39 is so proportioned that, when it is in the position shown in Fig. 1, its center piston overlaps port 45 and has its right end slotted so that communication between ports 45 and 46 is restricted but is sufficient for free flow of the greatest amount of liquid which might be discharged by pump 6 when its control is adjusted to neutral. Then when the drive is started, a part of the liquid discharged by pump 6 will at first be bypassed through valve 38 so that table 1 is gradually started and, when valve plunger 39 is shifted to the position shown in Fig. 7, the rate at which liquid is bypassed will be gradually reduced to zero.

If when valve plunger 39 is shifted from the position shown in Fig. 1 to the position shown in Fig. 7 it should uncover port 44 before port 42 was covered, gear pump 30 could discharge through low pressure relief valve 50 which would permit gear pump pressure to drop to such an extent that the DH controls could not operate. Therefore, plunger 39 is so proportioned and the left end of its center piston is slotted so that, as it moves from the position shown in Fig. 1 to the position shown in Fig. 7, port 44 is opened very gradually and communication between ports 44 and 43 is quite restricted until after port 42 is completely covered by the end piston of plunger 39.

Valve 38 is adapted to be operated in response to control DHI being adjusted into and out of a range of adjustments adjacent its neutral adjustment. This is accomplished by directing liquid to one end or the other of bore 41 under the control of a valve 60 which is operable in unison with valve member 19 of control DHI. For example, valve 60 may be provided by forming ports and passages in the outer end portion of valve member 19 to cooperate with ports and passages formed in the end head 13.

As shown, valve 38 has two channels 61 and 62 connected to opposite ends thereof in communication with opposite ends of bore 41. Channels 61 and 62 and a branch of gear pump supply channel 32 are connected to head 13 of control DHI. The adjacent ends of channels 32, 61 and 62 communicate with bore 14 in a plane situated between port 23 and an annular groove or port 63 (Fig. 2) which is formed in the wall of bore 14 adjacent the outer end thereof and communicates with an exhaust channel 64 which is adapted to convey liquid to a point of disposal such as reservoir 31.

Channel 32 is adapted to be connected to channels 61 and 62 selectively by means of four interconnected radial passages 65, 66, 67 and 68 (Fig. 3), which are formed in valve member 19 in the plane of channels 32, 61 and 62, and two grooves 69 and 70 which are formed in the peripheral surface of valve member 19 in communication with passages 65 and 66 respectively.

Channels 61 and 62 are adapted to be selectively connected to exhaust port 63 by means of a third groove 71 which is formed in the peripheral surface of valve member 19 between passages 67 and 68, an axial groove 72 which extends from groove 71 into communication with exhaust port 63, and two axial grooves 73 and 74 which lead from the plane of channels 61 and 62 into communication with exhaust port 63.

The arrangement is such that, when valve member 19 is adjusted to the position shown in Fig. 3, liquid may flow from supply channel 32 through groove 69, passages 65 and 67 and channel 62 to the right end of bore 41 and move valve plunger 39 to the position shown in Fig. 1 and the liquid expelled from the left end of bore 41 by plunger 39 will flow through channel 61, groove 73, port 63 and channel 64 to exhaust. When valve member 19 is moved to the position shown in Fig. 4, liquid may flow from supply channel 32 through groove 69, passages 65 and 66, groove 70 and channel 61 to the left end of bore 41 and move valve plunger 39 to the position shown in Fig. 7 and the liquid expelled from the right end of bore 41 by plunger 39 will flow through channel 62, grooves 71 and 72, port 63 and channel 64 to exhaust.

Channel 24 leading from control DHI is adapted to be connected to gear pump 30 and to exhaust alternately by a pilot valve having a valve plunger 75 fitted in the bore of a valve casing 76 and adapted to be shifted from one to the other of two positions by a reversing mechanism operable in response to table 1 reaching one end or the other of a predetermined stroke as determined by the positions of two dogs 77 and 78 which are fastened to table 1 in adjusted positions.

The reversing mechanism may assume various forms but, as shown, valve plunger 75 has its stem connected to one arm of a bell-crank lever 79 which is pivoted upon a stationary shaft 80 and has its other arm connected by a link 81 to one end of a lever 82 having the other end thereof mounted upon a shaft 83 which is arranged in a stationary position. Shaft 83 also has mounted thereon two reversing ears 84 and 85 which are fixed for rotation with lever 82 and have the ends thereof extending into the paths of dogs 77 and 78 respectively.

Valve plunger 75 controls communication between five annular grooves or ports 86, 87, 88, 89 and 90 which are formed in the wall of the bore of valve casing 76. Port 86 has channel 47 connected thereto so that it is continuously supplied with liquid from gear pump 30. Port 87 has channel 24 connected thereto. Ports 87 and 88 are connected by channels (not shown) to a cross-feed the mechanism which has not been illustrated as it forms no part of the present invention. Port 89 has channel 48 connected thereto and it is connected to port 90 by a passage 91 formed in valve casing 76.

In order to remove foreign matter which accumulates in the motive liquid, channel 34 is connected by a channel 92 to the inlet of a filter 93 which has its outlet connected by a channel 94 to channel 49 so that a part of the liquid discharged by gear pump 30 into channel 32 may flow through relief valve 33, channels 34 and 92, filter 93, channels 94 and 49 and relief valve 50 into reservoir 31. The inlet to filter 93 is restricted sufficiently to keep the flow through filter 93 at such a low rate that gear pump 30 is able to maintain in channel 34 a pressure equal to the resistance of the relief valve 37.

*Operation*

With the parts in the positions shown in Fig. 1 and pumps 6 and 30 running, gear pump 30 is maintaining pressure to keep both DH controls energized and to hold bypass valve plunger 39 in its left-hand position, the DH controls are holding slideblock 9 in its neutral position and pump 6 is at zero stroke so that no liquid is delivered thereby, but if it should discharge any liquid, that liquid would be bypassed through valve 38.

Assuming that table 1 is to be reciprocated continuously so that work fastened thereon may have a cut taken therefrom each time table 1 moves toward the right, the drive may be started in operation by rotating control lever 25 clockwise in respect to Fig. 3 to thereby rotate valve member 19. As soon as valve member 19 starts to rotate, groove 21 therein (Fig. 2) will open to port 18 and then gear pump liquid will start to flow through valve member 19 into cylinder 11 and piston 12 will start to move slideblock 9 downward in respect to Fig. 1 which will cause pump 6 to start to discharge liquid into channel 7. The rate of discharge will gradually increase from zero at the same rate that control lever 25 is rotated.

Pump 6 will at first discharge liquid at a very limited rate, and since considerable force is required to start table 1 moving, the liquid discharged by pump 6 will flow through channels 7 and 52, bypass valve 38 and channels 51 and 8 back to the intake of the pump until pump 6 is discharging liquid faster than the liquid can flow through the restricted grooves in bypass valve plunger 39 and then the liquid will flow through channel 7 to cylinder 2 and cause ram 3 to move table 1 toward the right.

Liquid will continue to flow at a limited rate through bypass valve 38 until valve member 19 has been rotated far enough to open groove 70 to channel 61 (Figs. 3 and 4) and to open groove 72 to channel 62. Then liquid will flow from gear pump supply channel 32 through valve member 19 and channel 61 to the left end of bypass valve 38 and shift its plunger 39 to the position shown in Fig. 7 and plunger 39 will expel liquid from the right end of bore 41 through channel 62 and valve member 19 to exhaust. Shifting valve plunger 39 to the position shown in Fig. 7 blocks communication between channels 51 and 52 so that liquid can no longer be bypassed through valve 38.

Thereafter, all of the liquid discharged by pump 6 will flow to cylinder 2 to drive table 1 and the speed of table 1 will gradually increase as long as rotation of control lever 25 continues within its effective range. Table 1 is thus started by moving lever 25 and its speed is determined by the position to which lever 25 is adjusted.

Table 1 will continue to move toward the right at the speed determined by the adjustment of control lever 25 until dog 77 engages reversing ear 84 and causes reversing mechanism 79—82 to shift pilot valve plunger 75 to the position shown in Fig. 6 to thereby disconnect channel 24 from gear pump 30 and connect it to exhaust so that gear pump liquid continuously supplied to control DH2 will cause piston 12ª to move slideblock 9 upward in respect to Fig. 1. Piston 12 will move with slideblock 9 and will eject liquid from cylinder 11 through check valve 27, channels 26 and 24, pilot valve casing 76, channel 48, bypass valve 38, channel 49 and relief valve 50 into reservoir 31. Relief valve 50 will resist the discharge of liquid therethrough and thereby prevent piston 12 and slideblock 9 from continuing to move after movement of piston 12ª ceases.

As slideblock 9 moves upward in respect to Fig. 1, the rate at which pump 6 delivers liquid to cylinder 2 will be gradually reduced, thereby gradually decelerating table 1. After slideblock 9 passes its central or neutral position, pump 6 will discharge liquid into channel 8 and this liquid will flow to cylinder 4 and cause ram 5 to move table 1 toward the left. As slideblock 9 continues beyond neutral pump 6 will deliver liquid to cylinder 4 at a gradually increasing rate and thereby gradually accelerate table 1.

Piston 12ª will continue to move slideblock 9 upward in respect to Fig. 1 until port 18ª moves out of registry with the groove 21ª in valve member 19ª and then further movement of slideblock 9 will cease because no more gear pump liquid can enter cylinder 11ª. The return speed of table 1 is thus determined by the adjustment of knob 28 on valve member 19ª.

Table 1 will continue to move toward the left at the speed determined by the adjustment of knob 28 until dog 78 engages reversing ear 85 and causes the reversing mechanism 79—83 to return pilot valve plunger 75 to the position shown in Fig. 1 to thereby disconnect channel 24 from exhaust and connect it to gear pump 30. Then gear pump liquid will flow through channel 24 to control DH1 which will reverse pump 6 as previously explained and thereby cause table 1 to again move toward the right at the speed determined by the adjustment of lever 25.

Table 1 will continue to reciprocate in this manner at a cutting speed determined by the adjustment of lever 25 and at a return speed determined by the adjustment of knob 28 but the operator without leaving his station may at any time vary the cutting speed by adjusting lever 25 to a new position or he may stop the table by moving lever 25 to its neutral position.

The normal range of reciprocation of table 1 is determined by the positions of dogs 77 and 78 but table 1 may be moved beyond its normal range of reciprocation to facilitate changing or inspecting the work on table 1. This may be accomplished by moving lever 25 to the left of its neutral position to rotate valve member 19 counterclockwise beyond its neutral position and thereby open groove 20 in member 19 to port 18 in piston 12 so that liquid can escape from cylinder 11.

If the parts are in the positions shown in Fig. 1 so that table 1 is stationary, moving lever 25 to the left to open groove 20 to port 18 will permit continuously energized piston 12ª to move slideblock 9 upward in respect to Fig. 1 which will cause pump 6 to discharge liquid into channel 8. Slideblock 9 will move upward and piston 12 will eject liquid from cylinder 11 through port 18, groove 20, bore 15 and slot 17 into pump casing 10 until port 18 moves out of communication with groove 20 and traps the remaining liquid in cylinder 11 to thereby stop further movement of slideblock 9 at which time pump 6 is discharging liquid at the rate determined by the position of lever 25.

The liquid discharged by pump 6 will be bypassed through valve 38 until valve member 19 has been rotated far enough by lever 25 to open passage 68 to channel 61 and groove 74 to channel 62 as shown in Fig. 5. Then gear pump liquid will flow from channel 32 through valve member 19 and channel 61 to the left end of valve 38 and shift its plunger 39 to the position shown in Fig. 7 to block channel 51 so that all of the liquid discharged by pump 6 must then flow through channel 8 to cylinder 4 and cause ram 5 to move table 1 toward the left at a slow rate as determined by the adjustment of lever 25. When table 1 reaches the desired position, it may be stopped by returning lever 25 to its neutral position which will cause pump 6 to be adjusted to neutral as previously explained.

If table 1 is moving toward the right on a cutting stroke, moving lever 25 to the left of its neutral position to open groove 20 to port 18 will permit piston 12ª to move slideblock 9 upward in respect to Fig. 1 and cause pump 6 to gradually decrease its rate of discharge into channel 7 as slideblock 9 moves toward neutral and to discharge liquid into channel 8 after slideblock 9 passes neutral.

Slideblock 9 will move upward and piston 12 will eject liquid from cylinder 11 through port 18, groove 20, bore 15 and slot 17 into pump casing 10 until port 18 moves out of communication with groove 20 and traps the remaining liquid in cylinder 11 to thereby stop further movement of slideblock 9 at which time pump 6 is discharging liquid at the rate determined by the position of lever 25.

The liquid discharged by pump 6 will flow through channel 8 to cylinder 4 and cause table 1 to move toward the left at a slow rate until it reaches the desired position and then it may be stopped by returning lever 25 to its neutral position as previously explained.

If table 1 is moving toward the left on a return stroke when lever 25 is moved to the left of its neutral position, table 1 will continue to move at the same speed until dog 78 engages ear 85 and operates reversing mechanism 79—83 to shift pilot valve plunger 75 to the position shown in Fig. 1. Then gear pump liquid will flow through valve casing 76, channel 24, port 23, passage 22, groove 21 and port 18 into cylinder 11 and cause piston 12 to move slideblock 9 downward in respect to Fig. 1 until port 18 moves out of communication with groove 21 to stop further movement of slideblock 9 at which time pump 6 is discharging liquid at the rate determined by the adjustment of lever 25. The liquid discharged by pump 6 will continue to move table 1 toward the left but at a reduced speed until table 1 reaches and is stopped in the desired position as explained above.

Control lever 25 thus may be operated to start, stop, and reverse the table, to move the table in either direction, to cause the table to reciprocate continuously within a predetermined range, to change the speed of the table and to move the table to a desired position outside that range.

The hydraulic drive described herein may be modified in various ways without departing from the scope of the invention which is hereby claimed as follows:

1. A hydraulic drive comprising hydraulic motor means for driving an element in opposite directions selectively, a pump hydraulically connected to said motor means and having a displacement varying member shiftable in one direction or the other from a neutral position to cause said pump to discharge liquid to said motor means in a direction and at a rate determined by the direction and distance said member is offset from its neutral position, means for urging said displacement varying member in one direction, a hydraulic servo-motor adapted when energized to move said member in the opposite direction against the resistance of said urging means, a follow-up valve associated with said servo-motor to control the volume of liquid delivered thereto to thereby determine the point to which said servo-motor can move said member, a control channel connected to said valve, means including a check valve for permitting liquid to escape from said servo-motor into said channel, a supply channel, means for supplying motive liquid to said supply channel, a pilot valve for connecting said control channel to said supply channel or to exhaust, and means responsive to said element approaching the end of its movement in each direction for shifting said pilot valve.

2. A hydraulic drive comprising hydraulic motor means for driving an element in opposite directions selectively, a pump hydraulically connected to said motor means and having a displacement varying member shiftable in one direction or the other from a neutral position to cause said pump to discharge liquid to said motor means in a direction and at a rate determined by the direction and distance said member is offset from its neutral position, means for urging said displacement varying member in one direction, a hydraulic servo-motor adapted when energized to move said member in the opposite direction against the resistance of said urging means, a follow-up valve associated with said servo-motor to control the volume of liquid delivered thereto to thereby determine the point to which said servo-motor can move said member, a control channel connected to said valve, means including a check valve for permitting liquid to escape from said servo-motor into said channel, a supply channel, means for supplying motive liquid to said supply channel, an exhaust channel having a low pressure relief valve connected thereto, a pilot valve for connecting said control channel to said supply channel or to said exhaust channel, and means responsive to said element approaching the end of its movement in each direction for shifting said pilot valve.

3. A hydraulic drive comprising hydraulic motor means for driving an element in opposite directions selectively, a pump hydraulically connected to said motor means and having a displacement varying member shiftable in one direction or the other from a neutral position to cause said pump to discharge liquid to said motor means in a direction and at a rate determined by the direction and distance said member is offset from its neutral position, means for urging said displacement varying member in one direction, a hydraulic servo-motor adapted when energized to move said member in the opposite direction against the resistance of said urging means, a follow-up valve associated with said servo-motor to control the volume of liquid delivered thereto to thereby determine the point to which said servo-motor can move said member, a control channel connected to said valve, means including a check valve for permitting liquid to escape from said servo-motor into said channel, a supply channel, means for supplying motive liquid to said supply channel, a pilot valve connected between said channels and adapted in one position to connect said control channel to said supply channel and in a second position to connect said control channel to exhaust, means responsive to said element approaching the end of its movement in each direction for shifting said pilot valve, a hydraulically operated valve for controlling communication between said pilot valve and exhaust, a fourth valve for controlling said hydraulically operated valve, and a single control element for simultaneously operating said fourth valve and said follow-up valve.

4. A hydraulic drive comprising hydraulic motor means for driving an element in opposite directions selectively, a pump hydraulically connected to said motor means and having a displacement varying member shiftable in one direction or the other from a neutral position to cause said pump to discharge liquid to said motor means in a direction and at a rate determined by the direction and distance said member is offset from its neutral position, means for urging said displacement varying member in one direction, a hydraulic servo-motor adapted when energized to move said member in the opposite direction against the resistance of said urging means, a follow-up valve associated with said servo-motor to control the volume of liquid delivered thereto to thereby determine the point to which said servo-motor can move said member, a control channel connected to said valve, means including a check valve for permitting liquid to escape from said servo-motor into said channel, a supply channel, means for supplying motive liquid to said supply channel, an exhaust channel having a low pressure relief valve connected thereto, a pilot valve connected between said channels and adapted in one position to connect said control channel to said supply channel and in a second position to connect said control channel to said exhaust channel, means responsive to said element approaching the end of its movement in each direction for shifting said pilot valve, a hydraulically operated valve for controlling communication between said pilot valve and said exhaust channel, a fourth valve for controlling said hydraulically operated valve, and a single control element for simultaneously operating said fourth valve and said follow-up valve.

5. A hydraulic drive comprising hydraulic motor means for driving an element in opposite directions selectively, a pump hydraulically connected to said motor means and having a displacement varying member shiftable in one direction or the other from a neutral position to cause said pump to discharge liquid to said motor means in a direction and at a rate determined by the direction and distance said member is offset from its neutral position, means for urging said displacement varying member in one direction, a hydraulic servo-motor adapted when energized to move said member in the opposite direction against the resistance of said urging means, a follow-up valve associated with said servo-motor to control the volume of liquid delivered thereto to thereby determine the point to which said servo-motor can move said member, a control channel connected to said valve, means including a check valve for permitting liquid to escape from said servo-motor into said channel, a supply channel, means for supplying motive liquid to said supply channel, an exhaust channel having a low pressure relief valve connected thereto, a pilot valve connected between said channels and adapted in one position to connect said control channel to said supply channel and in a second position to connect said control channel to said exhaust channel, means responsive to said element approaching the end of its movement in each direction for shifting said pilot valve, a hydraulically operated valve for controlling communication between said pilot valve and said exhaust channel and for bypassing said pump, a fourth valve for controlling said hydraulically operated valve, and a single control element for simultaneously operating said fourth valve and said follow-up valve.

6. A hydraulic drive comprising hydraulic motor means for driving an element in opposite directions selectively, a pump having a member shiftable to vary its displacement, fluid channels forming with said pump and said motor means a hydraulic circuit for the flow of liquid from said pump to said motor means to enable said motor means to drive said element, a first valve for effecting reversal of flow in said circuit, means responsive to said element approaching the end of its movement in each direction for effecting operation of said valve, means for urging said displacement varying member in one direction, a hydraulic servo-motor adapted when energized to move said member in the opposite direction against the resistance of said urging means, a second valve for directing liquid to and from said servo-motor, means for supplying motive liquid to said second valve to enable it to effect operation of said servo-motor, a hydraulically operated valve for bypassing said pump, a fourth valve for controlling said hydraulically operated valve, and a single control element for simultaneously operating said second valve and said fourth valve.

7. A hydraulic drive comprising hydraulic motor means for reciprocating an element, a pump having a member shiftable to vary its displacement, fluid channels forming with said pump and said motor means a hydraulic circuit for the flow of liquid from said pump to said motor means to enable said motor means to drive said element, means for urging said displacement varying member in one direction, a hydraulic servo-motor adapted when energized to move said member in the opposite direction against the resistance of said urging means, means for supplying motive liquid to said servo-motor, valve means adapted to control the flow of motive liquid to and from said servo-motor and operable to effect reversal of flow in said circuit, means responsive to said element reaching a given point during its movement in each direction for effecting operation of said valve means to thereby cause said element to reciprocate within a given range, and a manual valve adapted to control the flow of motive liquid to and from said servo-motor and operable to cause said servo-motor to move said displacement varying member in a direction to prevent said valve means from effecting reversal of flow in said circuit and to cause said motor means to move said element beyond said given range of reciprocation.

8. A hydraulic drive comprising hydraulic motor means for driving an element in opposite directions selectively, a pump hydraulically connected to said motor means and having a displacement varying member shiftable in one direction or the other from a neutral position to cause said pump to discharge liquid to said motor means in a direction and at a rate determined by the direction and distance said member is offset from its neutral position, means for urging said displacement varying member in one direction, a hydraulic servo-motor having a piston for moving said member in the opposite direction against the resistance of said urging means in response to motive liquid being supplied to said servo-motor, means for supplying motive liquid to said servo-motor, a valve member associated with the piston of said servo-motor and forming therewith a follow-up valve adapted to connect said servo-motor to said supply means and to exhaust selectively in response to relative displacement of said valve member and said piston and to cut off flow of liquid to or from said servo-motor in response to said piston reaching a position corresponding to the position of said valve member, other means for controlling the flow of liquid to and from said servo-motor including a second valve adapted to occupy two positions in the first of which it connects said follow-up valve to said supply means and in the second of which it connects said servo-motor to exhaust, means responsive to said element reaching a given position for adjusting said second valve to its first position to enable said servo-motor to shift said displacement varying member in a direction and to a position to cause said pump to deliver liquid to said motor means in a direction and at a rate to enable said motor means to advance said element at the rate determined by the position of said valve member, and means responsive to said element reaching a given position during its advance movement for adjusting said second valve to its second position to connect said servo-motor to exhaust and thereby enable said urging means to shift said displacement varying member in the opposite direction to a position to cause said pump to deliver liquid to said motor means in the opposite direction and at a rate to enable said motor means to retract said element at the rate determined by the position to which said displacement varying member was moved by said urging means.

9. A hydraulic drive comprising hydraulic motor means for driving an element in opposite directions selectively, a pump hydraulically connected to said motor means and having a displacement varying member shiftable in one direction or the other from a neutral position to cause said pump to discharge liquid to said motor means in a direction and at a rate determined by the direction and distance said member is offset from its neutral position, means for urging said displacement varying member in one direction, a hydraulic servo-motor having a piston for moving said member in the opposite direction against the resistance of said urging means in response to motive liquid being supplied to said servo-motor, means for supplying motive liquid to said servo-motor, a valve member associated with the piston of said servo-motor and forming therewith a follow-up valve adapted to connect said servo-motor to said supply means and to exhaust selectively in response to relative displacement of said valve member and said piston and to cut off flow of liquid to or from said servo-motor in response to said piston reaching a position corresponding to the position of said valve member, other means for controlling the flow of liquid to and from said servo-motor including a second valve adapted to occupy two positions in the first of which it connects said follow-up valve to said supply means and in the second of which it connects said servo-motor to exhaust, means responsive to said element reaching a given position for adjusting said second valve to its first position to enable said servo-motor to shift said displacement varying member in a direction and to a position to cause said pump to deliver liquid to said motor means in a direction and at a rate to enable said motor means to advance said element at the rate determined by the position of said valve member, means responsive to said element reaching a given position during its advance movement for adjusting said second valve to its second position to connect said servo-motor to exhaust and thereby enable said urging means to shift said displacement varying member in the opposite direction to a position to cause said pump to deliver liquid to said motor means in the opposite direction and at a rate to enable said motor means to retract said element at the rate determined by the position to which said displacement varying member was moved by said urging means, and manual means for moving said follow-up valve member in one direction from a neutral position to vary the rate at which said element is advanced and for moving said valve member in the opposite direction from its neutral position to cause said element to be retracted regardless of the position of said second valve.

JAMES K. DOUGLAS.

REFERENCES CITED

The following references are of record in the file of this patent:

UNITED STATES PATENTS

| Number | Name | Date |
|---|---|---|
| 2,114,005 | Tyler | Apr. 12, 1938 |
| 2,389,829 | Tyler | Nov. 27, 1945 |